(12) United States Patent
Chang et al.

(10) Patent No.: US 11,283,744 B2
(45) Date of Patent: Mar. 22, 2022

(54) REACTIVE BACKPRESSURE FOR EAST-WEST MESSAGING IN AN EMBEDDED CONTROL CLUSTER

(71) Applicant: Cisco Technology, Inc., San Jose, CA (US)

(72) Inventors: An-Chun Chang, Santa Clara, CA (US); Gaurav Sharma, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/102,101

(22) Filed: Nov. 23, 2020

(65) Prior Publication Data
US 2022/0052972 A1 Feb. 17, 2022

Related U.S. Application Data

(60) Provisional application No. 63/065,825, filed on Aug. 14, 2020.

(51) Int. Cl.
| | |
|---|---|
| *H04L 12/58* | (2006.01) |
| *H04L 29/08* | (2006.01) |
| *H04L 51/00* | (2022.01) |
| *H04L 67/50* | (2022.01) |

(52) U.S. Cl.
CPC .............. *H04L 51/12* (2013.01); *H04L 67/22* (2013.01)

(58) Field of Classification Search
CPC ......... H04L 51/12; H04L 67/22; H04L 51/04; H04L 65/1073; G06Q 30/0269; G06F 9/4881
See application file for complete search history.

(56) References Cited

U.S. PATENT DOCUMENTS

| | | | |
|---|---|---|---|
| 9,509,529 B1 | 11/2016 | McAllister et al. | |
| 2008/0034045 A1* | 2/2008 | Bardsley | ................. H04L 51/00 709/206 |
| 2018/0213018 A1 | 7/2018 | Madani et al. | |
| 2020/0151642 A1 | 5/2020 | Kancharla et al. | |

OTHER PUBLICATIONS

Apache Activemq Artemis User Manual, "Flow Control," downloaded Sep. 21, 2020 from https://activemq.apache.org/components/artemis/documentation/latest/flow-control.html; pp. 1-5.

(Continued)

*Primary Examiner* — Soe Hlaing
(74) *Attorney, Agent, or Firm* — Baker Botts, LLP

(57) ABSTRACT

According to certain embodiments, a message bus system comprises a first client and a second client. The first client is configured to publish messages associated with a message topic to a message bus, and the second client is configured to receive the messages associated with the message topic from the message bus. The message bus system is configured to unsubscribe the second client from the message topic based at least in part on determining that a demand of the second client for the messages associated with the message topic has fallen below a threshold.

17 Claims, 4 Drawing Sheets

Message Bus System 100

(56) References Cited

OTHER PUBLICATIONS

Spring Integration Reference Guide, "Reactive Streams Support," Version 5 3.2, dated Jul. 22, 2020, downloaded Sep. 21, 2020 from https://docs.spring.io/spring-integration/reference/html/reactive-streams.html; pp. 1-8.
https://www.reactive-streams.org; Sep. 29, 2020; Reactive Streams; pp. 1-4.
The Reactive Manifesto; Published on Sep. 16, 2014 (v2.0); 2 pages.
MicroProfile Reactive Messaging Specification; James Roper, Clement Escoffier, Gordon Hutchison; 1.0, Jul. 4, 2019; 33 pages.

* cited by examiner

REACTIVE BACKPRESSURE FOR EAST-WEST MESSAGING IN AN EMBEDDED CONTROL CLUSTER

RELATED APPLICATION

This application claims the benefit of U.S. Provisional Application No. 63/065,825 entitled "Reactive Backpressure for East-West Messaging in an Embedded Control Cluster," filed Aug. 14, 2020 which is incorporated herein by reference.

TECHNICAL FIELD

Certain embodiments of the present disclosure relate to computer networks and, more specifically, to reactive backpressure for messaging in an embedded control cluster.

BACKGROUND

Message delivery systems may be used to send messages from publishers to subscribers. Backpressure may occur when a subscriber is unable to keep up with the rate of messages being received from a publisher. For example, backpressure may occur when the publisher has sent more than a maximum number of messages to the subscriber without receiving an acknowledgement.

DESCRIPTION OF EXAMPLE EMBODIMENTS

Overview

Figure 1:
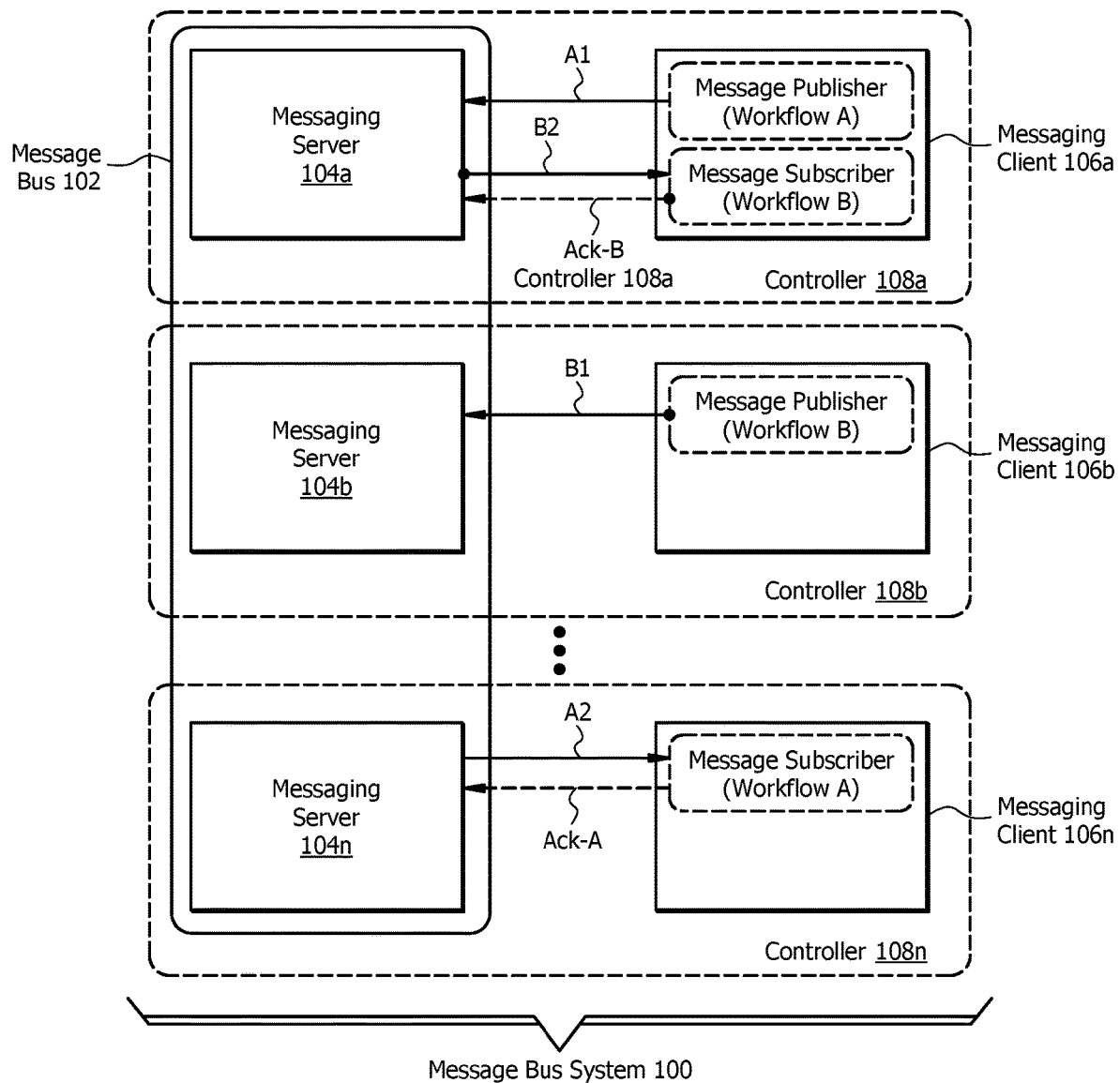
FIG. 1 illustrates an example of a message bus system.

A messaging layer can be defined for a controller, such as a vManage controller in a Software-Defined (SD)-Wide-Area Network (WAN). For example, the messaging layer can be defined in the management plane. A messaging client layer may support messaging operations. Examples of messaging operations include message topic registration, publishing, and subscription. Message topic registration may include registering all message topics at process start. Message topics may be known a-priori and statically configured. Instances within a cluster should agree (or be manually made to agree) on the list of message topics. Message topics declare the behavior for local message publishers and local message subscribers. With respect to publishing, messages can be published synchronously or asynchronously. With respect to subscription, downstream consumers may provide a callback to be executed. Depending on the number of threads specified in message topic registration, downstream callback may or may not perceive ordered delivery of messages.

Configuration of the messaging layer can be described in three operational phases: Message publishing, Message subscription (streaming), and Message delivery (local dispatch to upstream delivery callbacks). Various behavioral parameters governing each operational phase can be set over a given message topic, via a message topic configuration. The scope of the configuration setting may be over the entire message topic, that is, it governs the behavior of all publishers and all subscribers for a given message topic.

Message dispatch back-pressure can occur when message publishers overwhelm the system with sustained message publish rates that cannot be kept up by message subscribers. A back-pressure mechanism on the message subscription side can be configured to not allow the messaging server to send additional published messages to be queued up on the client side. This is done via a reactive back-pressure mechanism, by modeling the message bus client's message dispatch acknowledgement (ACK'ing the server's message publication) as the inverse of the reactive stream subscription demand. So, when outstanding ACKs reach a configured limit, the reactive stream's subscription demand becomes 0. Once the demand reaches 0, the messaging client layer cancels the subject subscription corresponding to that messaging client layer's message topic subscription. Upon each successful application layer message dispatch (i.e., the callback returns), reactive stream subscription demand will become "replenished." When the demand is greater than 0, the messaging client layer will resume the corresponding subscription.

According to certain embodiments, a message bus system comprises a first client and a second client. The first client is configured to publish messages associated with a message topic to a message bus, and the second client is configured to receive the messages associated with the message topic from the message bus. The message bus system is configured to unsubscribe the second client from the message topic based at least in part on determining that a demand of the second client for the messages associated with the message topic has fallen below a threshold. In some embodiments, the message bus system includes one or more processors and one or more computer-readable non-transitory storage media. The one or more computer-readable non-transitory storage media comprise instructions that, when executed by the one or more processors, cause one or more components of the message bus system to perform the operations of the message bus system.

According to another embodiment, a method comprises determining that a demand of client for receiving messages associated with a message topic via a message bus has fallen below a first threshold. The demand is based on a number of messages associated with the message topic that have been published to the client via the message bus but have not yet been acknowledged by the client. The method further comprises unsubscribing the client from the message topic based at least in part on determining that the demand of the client for receiving the messages associated with the message topic via the message bus has fallen below the first threshold.

According to yet another embodiment, one or more computer-readable non-transitory storage media may embody instructions that, when executed by a processor, cause the performance of operations including determining that a demand of client for receiving messages associated with a message topic via a message bus has fallen below a first threshold. The demand is based on a number of messages associated with the message topic that have been published to the client via the message bus but have not yet been acknowledged by the client. The operations further comprise unsubscribing the client from the message topic based at least in part on determining that the demand of the client for receiving the messages associated with the message topic via the message bus has fallen below the first threshold.

Technical advantages of certain embodiments of this disclosure may include one or more of the following. Certain embodiments allow for managing the rate at which a producer produces a stream of messages so that consumers of the stream are better able to keep up with the rate of message production, thereby reducing consumption lag without trading off fast processing of pending messages. Certain embodiments allow for managing when a consumer of the stream pulls a message from a bus. For example, by waiting to pull the message until the application is ready to process it, unnecessary polling can be avoided.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

A clustered controller system provides management over data-path. In certain embodiments, a clustered controller system may be deployed as a closed system where hardware resources do not come from external resource pools. The clustered controller system may comprise an embedded controller (e.g., a controller that is part of the network topology of the system that it is controlling). A clustered controller system may be homogenous or heterogenous in its make-up. In a homogenous system, each machine within the cluster may be basically the same as the others at least in the sense that the machines have certain characteristics in common, such as computing capabilities, bandwidth, and/or consumption power. In a heterogeneous system, different machines within the cluster may be different from one another, for example, in terms of computing capabilities, bandwidth, consumption power, and/or other characteristics.

The clustered-controller system relies on coordinated or directed actions issued by one part of the clustered system to some or all parts of the clustered system to act upon the direction. This is typically done via a message bus with topical message publish and message topic subscriptions. A common problem with using a cluster message bus is consumption lag, or more specifically, ever-growing consumption lag where the producer of a stream and the consumer(s) of the stream start to drift apart because the consumers are unable to keep up with the rate of message production. The problem may be particularly challenging for embedded control cluster with limited system resources (as opposed to cloud data-centers where operations can tune the message buffer to be arbitrarily large to deal with a sudden influx of messages or events funneled through an external message bus). Also, both the client-view and the server-view of the message bus are co-resident on the same set of virtual machines on the cluster. Certain embodiments of the present disclosure may provide solutions to this and other problems.

FIG. 1 illustrates an example of a message bus system 100. The message bus system 100 includes a message bus 102 comprising one or more messaging servers 104 communicatively coupled to messaging clients 106. The example shown in FIG. 1 includes messaging servers 104a, 104b, . . . 104n and messaging clients 106a, 106b, . . . 106n. In general, message bus system 100 facilitates delivering messages to messaging clients 106 and, if congestion occurs, performing actions to mitigate the congestion. The actions may include throttling a rate at which a messaging client 106 sends messages and/or managing a subscription status of a messaging client 106 that receives messages, as further discussed below.

In the example shown in FIG. 1, messaging server 104a and messaging client 106a are configured within a first controller 108a, messaging server 104b and messaging client 106b are configured within a second controller 108b, and messaging server 104n and messaging client 106n are configured within an $n^{th}$ controller 108n. For simplicity, FIG. 1 illustrates each controller 108 as comprising one messaging server 104 and one messaging client 106, however, in other embodiments, a controller 108 may include multiple messaging servers 104 and/or multiple messaging clients 106. A messaging server 104 may be dedicated to one controller 108 or shared among multiple controllers 108, depending on the embodiment. In certain embodiments, a controller 108 may run on a host machine (virtual or physical) and may house a set of processes that interact with peer entities (e.g., machines) to provide application functionality to manage or control other entities. Controllers 108a, 108b, . . . 108n may form a cluster (e.g., a deployment of controllers 108 configured as peers of one another via a computer network). In certain embodiments, the message bus system 100 may be implemented in an embedded control cluster or other enclosed system with limited resources (as opposed to a non-enclosed system that can deal with a sudden influx of messages by adding resources, such as increasing a buffer size or offloading messages to an external message bus).

In certain embodiments, message bus 102 comprises a messaging fabric made up of messaging servers 104a, 104b, . . . 104n in a cluster. Each messaging server 104 may be configured to receive messages published by one or more of the messaging clients 106, determine a route for the messages, and deliver the messages across the fabric to the intended destination, such as a message topic. In this manner, a messaging server 104 may act as a process within a controller 108 that peers with other processes of its kind (e.g., other messaging servers 104 in other controllers 108 within the same cluster), for example, with the goal of providing operations of a messaging layer. In certain embodiments, the messages sent via message bus 102 comprise application network messages.

Message bus 102 may comprise any suitable hardware and/or software. In some embodiments the hardware and/or software may implement a cluster system capable of (1) receiving a message at an ingress of a message bus fabric, and (2) sending the message to an egress of the message bus fabric for delivery to a targeted destination (e.g., message topic). As an example, for a given message, the message bus fabric may comprise a messaging server 104 configured as an ingress for the message and another messaging server 104 configured as an egress for the message. In this manner, any messaging client 106 from any part of the cluster, if subscribed to the message topic, can come to the egress of the message bus fabric and receive the same set of published messages in the same order as any other messaging client 106 that is in the same cluster and is a subscriber of the message topic.

In some embodiments, egress points for message bus 102 may be defined based on the connecting clients 106. For example, if no client 106 associated with a messaging server 104 is a subscriber for messages of a particular topic or type, then that particular messaging server 104 need not be an egress point for messages of that particular topic or type. In certain embodiments, the egress point may be considered dynamic, for example, in the sense that if a client 106 associated with the messaging server 104 becomes a subscriber for messages of a particular topic or type, then that messaging server 104 would become an egress point for messages of that particular topic or type. In general, in a message bus system 100, the egress can be constrained or "sharded" such that certain messaging servers 104 can be part of the egress set. A particular messaging server 104 might or might not be an egress point, for example, depending on the particular message to be delivered.

In general, a messaging client 106 within a controller 108 connects to a local or remote messaging server 104 within the cluster in order to send or receive messages. As an example, messaging client 106 may comprise a process (or thread within a process) within controller 108. In some embodiments, client 106 may be implemented as an application server or as a portion of an application server. A messaging client 106 may be referred to as a "client" for short, as a "publisher," a "producer," or a "sender" with respect to messages that client 106 sends to message bus 102, and/or as a "subscriber," a "consumer," or a "receiver" with respect to messages that client 106 receives via message bus 102.

In some embodiments, a client 106 may perform one or more message publisher workflows, one or more message subscriber workflows, or both. A message publisher workflow uses a client 106 to publish a message to the message bus 102 under a message topic category. A message subscriber workflow uses a client 106 to subscribe, via message bus 102, to a stream of messages that message publishers publish to a message topic category (e.g., the message subscriber receives messages previously published to the message topic and new messages as they are published to the message topic in the future). The message bus system 100 shown in FIG. 1 may accommodate a number of workflows in parallel. For example, FIG. 1 illustrates a first workflow A and a second workflow B. In the first workflow A, a first client 106a sends message A to message bus 102, message bus 102 delivers message A to a second client 106n, and second client 106n sends an acknowledgment Ack-A to message bus 102. In the second workflow B, a third client 106b sends message B to message bus 102, message bus 102 delivers message B to first client 106a, and first client 106a sends an acknowledgment Ack-B to message bus 102. Thus, in the example of FIG. 1, first client 106a is configured as a publisher/producer/sender with respect to workflow A and as a subscriber/consumer/receiver with respect to workflow B.

To elaborate further on the first workflow A, the first client 106a sends message A to message bus 102 (this portion of the message flow is labeled A1 in FIG. 1). Message bus 102 sends message A to second client 106n, for example, via a message topic to which second client 106n subscribes (this portion of the message flow is labeled A2 in FIG. 1). Second client 106n sends an acknowledgement (Ack-A) to message bus 102 in order to indicate that second client 106n has received message A. Second client 106n may be configured to send the acknowledgement at any suitable time, such as immediately upon receipt of message A or after performing a certain amount of processing of message A or according to a backpressure mechanism, e.g., during times of congestion, depending on the embodiment.

In some embodiments, message bus 102 monitors a number of messages sent to second client 106n and a number of messages acknowledged by second client 106n. For example, message bus 102 increments a counter for each message sent to second client 106n and decrements the counter for each message acknowledged by second client 106n. If the number of unacknowledged messages exceeds a threshold (e.g., if the counter value exceeds a threshold), message bus 102 may throttle first client 106a in order to allow second client 106n to catch up with the unacknowledged messages. In certain embodiments, throttling may be adjusted dynamically depending on the number of unacknowledged messages (e.g., increase the throttling when the number of unacknowledged messages is high, and decrease the throttling when the number of unacknowledged messages is low). Once the number of unacknowledged messages decreases (e.g., when the counter value falls below the threshold), message bus 102 may stop throttling first client 106a.

Functionality of message bus 102 may be performed by any suitable component thereof, such as by one or more of the messaging servers 104. Functionality may be distributed among messaging servers 104 in any suitable manner. As one example, first messaging server 104a may receive message A from first client 106a and may route message A to messaging server 104n for delivery to second client 106n. Messaging server 104n may monitor acknowledgements (e.g., Ack-A) from second client 106n. If the number of unacknowledged messages exceeds a threshold, messaging server 104n may indicate to messaging server 104a to throttle first client 106a, and messaging server 104a may then throttle first client 106a. Thus, a messaging server 104 may coordinate with other messaging servers 104 of bus 102, for example, to obtain information about clients 106, such as the status as to whether a subscriber client is unable to keep up with message rate of a publisher client or whether a publisher client has been throttled.

In certain embodiments, a subscription status of a subscriber client 106 may be managed in order to reduce congestion in message bus system 100. For example, client 106 may be unsubscribed from a message topic during times of congestion and may be re-subscribed to the message topic once the congestion subsides. A client 106's subscription status may be managed by any suitable component of message bus system 100. For example, a client 106 may itself manage the subscriptions to which it subscribes, unsubscribes, and re-subscribes, or a messaging server 104 may manage subscriptions on behalf of client 106 (for example, messaging server 104 may track a number of messages that have not yet been acknowledged by client 106 and may instruct client 106 to unsubscribe or re-subscribe to a message topic based on whether the number of messages is higher or lower than a threshold). The sections below provide further examples of unsubscribing and re-subscribing to message topics.

Certain embodiments provide a reactive paradigm between the message producers and message consumers across the cluster network. Message producers should be throttled according to the pace at which the message stream's consumers are consuming in order to avoid ever-growing lag. Furthermore, messages should not be pulled from the message bus until the application is ready to process it. That is, a message consumer (within application) should react to the presence of published messages in the bus as to not overwork the network with incessant polling. In combination with a replicated and durable message bus, the reactive backpressure provides both safety and correctness guarantees without trading off fast processing of pending messages. Certain embodiments use reactive backpressure with respect to East-West messaging in an embedded control cluster. East-West messaging may refer to peer-to-peer traffic where the source and destination are controller instances within the cluster (as opposed to traffic originating or destined for entities external to the cluster).

Certain embodiments tie message topic subscription, unsubscription, and re-subscription to reactive stream request/back-pressure mechanism, for example:

If the cumulative outstanding demand for more messages reduces to zero locally, message topic subscription is cancelled at the message bus level to avoid incessant network communication between the application and the message bus itself.

Whenever the local (application) demand for more messages rises above zero, message topic re-subscription is initiated with the message bus, resuming prior subscription state (i.e., resume at the first non-consumed message).

Back-pressure is modeled using physical network message acknowledgement between the message bus and application messaging client. Every unacknowledged message is tracked both on the client-side as well as the server-side as reduction of consumer demand, and every new message acknowledgment replenishes consumer demand.

Certain embodiments separate consumer processing of messages, with respect to back-pressure book-keeping, in two separate phases. The first phase (receiving) receives a message from the message bus. The second phase (processing) executes application call-back on message-receipt. This allows "stalled" message consumption to be treated differently in back-pressure, accounting for whether it is stalled in the receiving phase (i.e., stalled network), or stalled in the processing phase (i.e., application stalled in call-back).

Managing back-pressure directly between controllers and message bus (producer-side), and message bus to controllers (consumer-side), the transitive propagation allows the controller cluster to leverage message bus as a conduit mechanism to propagate back-pressure between consumers and producers. That is, message bus is leveraged as a tool without needing to provide any intrinsic awareness to network management application's control traffic flow or traffic pattern. Thus, unmanaged pressure hot-spots can be avoided. This improves system performance because unmanaged pressure hot-spots can cause a clustered system to stall or livelock where the system is busy processing control directives, without making meaningful progress because certain critical sub-workflow is completely jammed up, unable to keep up with influx of control directives. This often contributes to a negative feedback loop where the rest of the system sends even more command directives due to the lack of progress, jamming up the system even more. Without the benefit of an externally managed message bus to buffer for messages for offline processing or delayed processing, a cluster of embedded controllers need to rely on self-policing in order to prevent hot-spots from building up and crippling the controller cluster from making forward progress.

Certain embodiments reduce the occurrence of the scenario where a producer leaves (any) consumers behind, leading to a choice where the messaging framework or the consumer must choose to either let go of messages that the system can no longer buffer, or raise an error and forcibly break the consumer subscription. The back pressure mechanism is built with a combination of processing logic and states, kept both on the client side and the server side.

For each subscription, the server side maintains:
Last acknowledged message sequence and list of unacknowledged messages.
List of outstanding messages that have been sent for delivery/redelivery at least once, and a sliding window bounded by some maximum window size defined for the subscription (as requested by the subscriber).

The client side (consumer) maintains:
An acknowledgement map that is at least as large as the maximum window size it requested for its subscription. This tracks a list of n previously received messages, where n is bounded by the sliding window size that the server maintains.
The current outstanding demand, where outstanding can be defined as maximum tolerance (initial demand) minus the number of received but not-yet-acknowledged messages (presumably due to processing delays).

In addition, the server-side will throttle the producer from being able to force more traffic into the system when there is known pressure signaled by the downstream consumption (s) by refusing to consume (or buffer) more messages for delivery acknowledgement.

Certain embodiments include further logic that controls when and how to apply the back-pressure mechanism in order to balance tradeoffs between reducing messaging traffic volumes versus internal state-machine churns on both the messaging servers and clients, for example, in order to reduce or prevent subscription flapping due to oscillating demand around zero.

In a push-delivery subscription system, avoiding redelivery due to a stuck delivery pipeline on the receiving end can in the end save more congestion than keeping the pipe open. Active congestion control is one way to limit the amount of redelivery traffic. Certain embodiments of the present disclosure use a simpler control by breaking the active subscription (with one network control message to unsubscribe, and one network control message to re-subscribe). The server in this case retains the subscription state while the subscription is not "active." The trade-off here is avoiding incessant redelivery of messages.

In a poll-based subscription system, the active sub/unsub can be implicitly built into each poll( ) control message sent from the client to the server. The net-effect can be minimized to be equivalent or no-worse than no active sub/unsub— instead the client can simply refuse to poll or update its subscription cursor position. From the server perspective, this has the same effect of stalling the producer from running away with unmaintainable publish rates with the backpressure mechanism described.

Certain embodiments incorporate a bounded random delay that reduces the rate of flapping. The bound can be adaptively implemented as a median of last k durations of elapsed time between demand flapping around 0 (i.e., duration between demand reaching 0 to demand rising above 0, with the initial duration value being a pure randomly generated seed value).

Figure 2A:
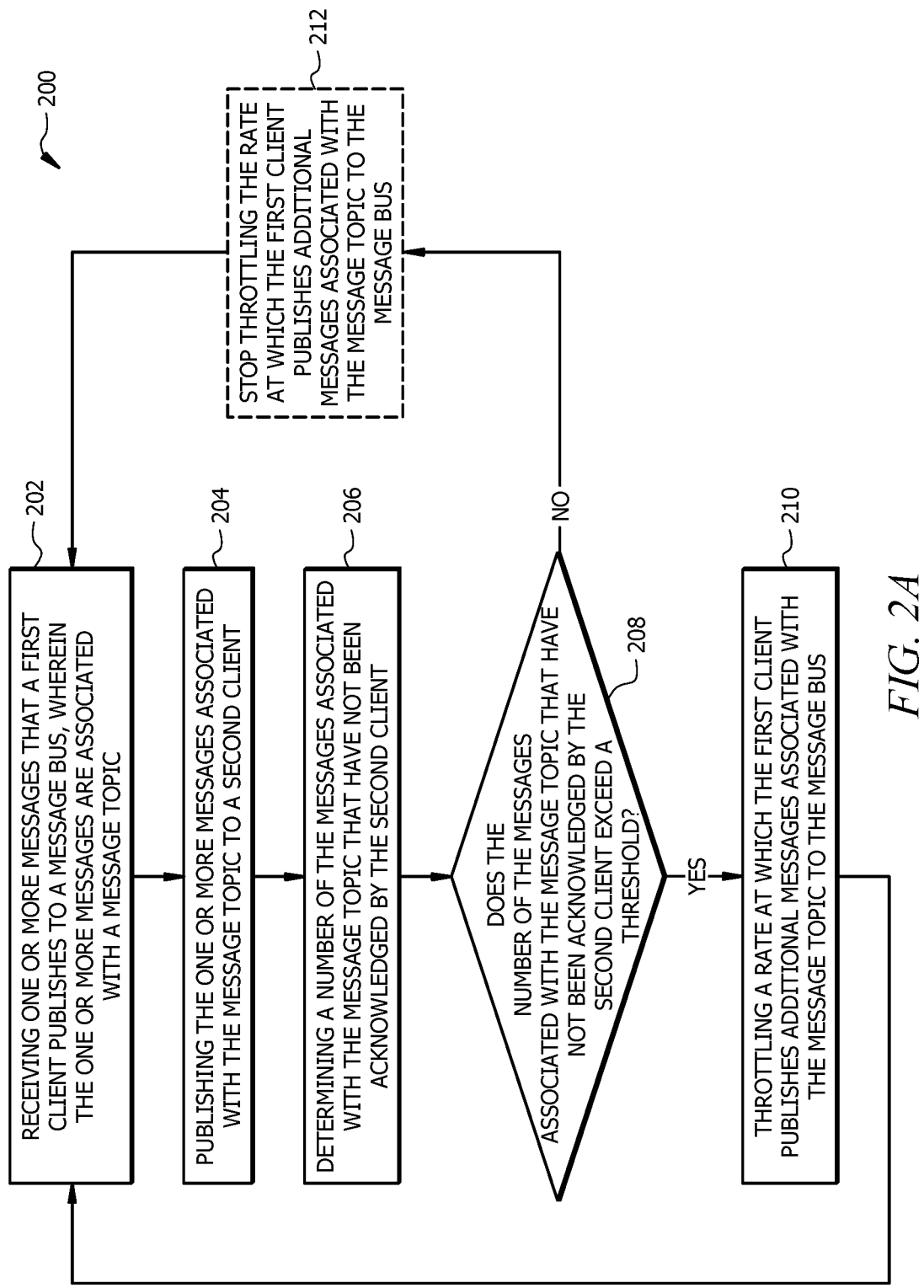
FIGS. 2A and 2B illustrate examples of methods that may be performed by a message bus system.
Figure 2B:
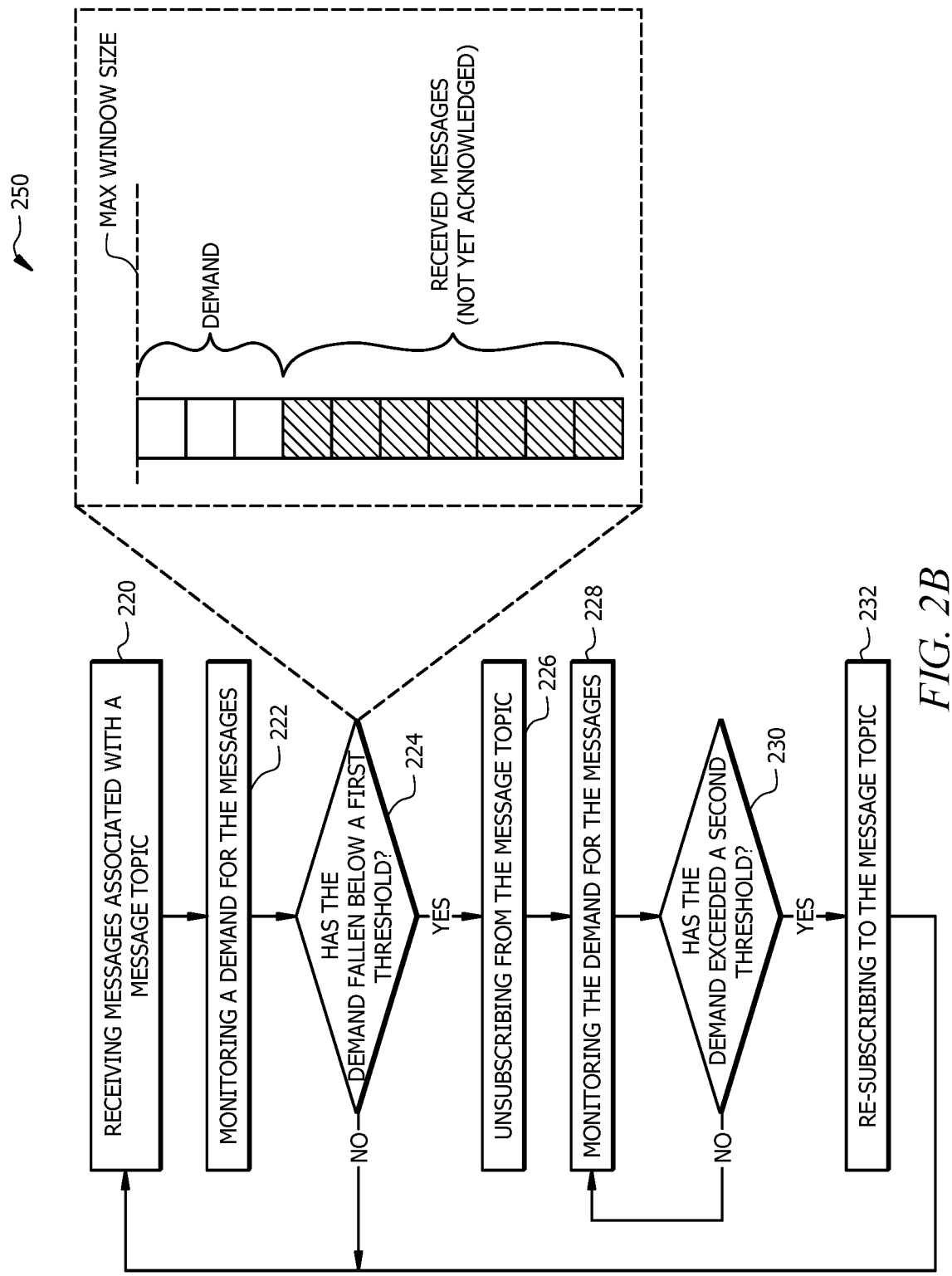

FIG. 2A and FIG. 2B illustrate examples of methods 200 and 250 that may be performed by a message bus system, such as the message bus system 100 described with respect to FIG. 1. As an example, message bus system 100 may comprise processing circuitry (e.g., one or more processors) and one or more computer-readable non-transitory storage media comprising instructions that, when executed by the processing circuitry, cause one or more components of message bus system 100 to perform method 200 of FIG. 2A and/or method 250 of FIG. 2B. In some embodiments, processing circuitry associated with message bus 102 of message bus system 100 may perform method 200 of FIG. 2A. In some embodiments, processing circuitry associated with a client 106 of message bus system 100 that is configured as a subscriber/consumer/receiver of messages may perform method 250 of FIG. B. In some embodiments, message bus 102 performs method 200 of FIG. 2A while client 106 performs method 250 of FIG. 2B in order to provide congestion mitigation at different portions of message bus system 100 being impacted by the congestion. As described with respect to FIG. 1, message bus 102 of message bus system 100 may comprise a messaging fabric made up of a plurality of messaging servers 104. Thus, in some embodiments, methods performed by message bus 102 may be performed by one or more components thereof, such as by one or more of the messaging servers 104.

As to FIG. 2A, in some embodiments, method 200 begins at step 202 with receiving one or more messages associated with a message topic. The one or more messages are received from a first client 106a (a client configured as a publisher/producer/sender with respect to the message topic) via message bus 102. Method 200 proceeds to step 204 with publishing the one or more messages associated with the message topic to a second client 106b (a client configured as a subscriber/consumer/receiver with respect to the message topic). For each message published in step 204, message bus 102 expects to eventually receive an acknowledgment from second client 106b. Failure to receive an acknowledgement in a timely manner (or at all) may indicate that the message was delayed, dropped, or experienced some other problem.

At step 206, method 200 determines a number of the messages associated with the message topic that have not yet been acknowledged by the second client 106b (i.e., unacknowledged messages). As an example, method 200 may use a counter to track the number of messages that have not been acknowledged by the second client 106b. The counter may be incremented for each message published to second client 106b in step 204 and decremented for each message acknowledged by the second client 106b.

At step 208, method 200 determines whether the number of the messages associated with the message topic that have not been acknowledged by the second client 106b exceeds a threshold. In some embodiments, the threshold may be set dynamically or different threshold values may be used depending on an overall level of congestion in message bus system 100. Thus, the threshold may be higher during times of low overall congestion and the threshold may be lower during times of high overall congestion. In some embodiments, the number of the messages associated with the message topic that have not been acknowledged by the second client 106b may be added with the number of the messages associated with the message topic that have not been acknowledged by other clients 106 to determine whether collectively the unacknowledged messages associated with the message topic exceeds the threshold.

In response to determining at step 208 that the number of messages associated with the message topic that have not been acknowledged by the second client 106b (i.e., the number of unacknowledged messages) exceeds the threshold, method 200 proceeds to step 210 with throttling a rate at which the first client 106b publishes additional messages associated with the message topic to the message bus 102. Method 200 may then return to step 202 with receiving the additional messages from the first client 106a according to the throttled rate.

Alternatively, in response to determining at step 208 that the number of messages associated with the message topic that have not been acknowledged by the second client 106b (i.e., the number of unacknowledged messages) does not exceed the threshold, method 200 skips step 210 and may return to step 202 in order to receive additional messages associated with the message topic from the first client 106a without throttling the first client 106a. Optionally, if the first client 106a had previously been throttled and if at step 208 it is determined that the number of unacknowledged messages is below the threshold, method 200 may further including stopping the throttling of the first client 106a, as shown in step 212. Further, some embodiments may utilize a timer to ensure that the number of unacknowledged messages has remained below the threshold for at least a pre-determined amount of time before stopping the throttling.

For simplicity, the above description has been provided in terms of starting/stopping the throttling. Other embodiments may gradually/incrementally increase throttling of the first client 106a (e.g., at step 210) and/or decrease throttling of the first client 106a (e.g., at step 212). The throttling is inversely related to the publication rate (i.e., the rate at which first client 106a publishes messages to message bus 102). Thus, increasing the throttling causes the publication rate to decrease, and decreasing the throttling allows the publication rate to increase. The throttling may be adjusted based on any suitable conditions. As an example, certain embodiments may configure different thresholds associated with the number of unacknowledged messages to trigger different levels of throttling (e.g., increase throttling as the number of unacknowledged messages increases/decrease throttling as the number of unacknowledged messages decreases). As another example, certain embodiments may configure a timer and, if congestion persists (e.g., the number of unacknowledged messages continues to exceed the threshold) upon expiry of the timer, begin throttling or increase the throttling. Similarly, certain embodiments may configure a timer (e.g., another timer) and, if congestion reduction persists (e.g., the number of unacknowledged messages remains less than the threshold) upon expiry of the timer, stop throttling or decrease the throttling. Other examples may include some combination of threshold(s), counter(s), timer(s), and/or other suitable mechanisms for determining whether to throttle the first client 106a and/or a level at which to throttle the first client 106a.

Turning to FIG. 2B, in certain embodiments, method 250 begins at step 220 with receiving messages associated with a message topic from message bus 102. For example, second client 106b (subscriber) receives the messages at queue or buffer associated with second client 106b. Method 250 proceeds to step 222 with monitoring the demand of second client 106b for messages associated with the message topic. The demand is based on a number of messages associated with the message topic that have been published to second client 106b via the message bus but have not yet been acknowledged by second client 106b.

Note that in embodiments where, for example, message bus 102 performs method 200 of FIG. 2A while the second client 106b performs method 250 of FIG. 2B, the number of unacknowledged messages determined in step 206 of FIG. 2A may be tracked from the perspective of message bus 102, whereas the number of unacknowledged messages determined in step 222 may be tracked from the perspective of second client 106b. As an example, in some embodiments, second client 106b may keep track of unacknowledged messages by monitoring a current window size of a queue or buffer associated with second client 106b. The current window size may increase in response to receiving a message at the queue or buffer and may decrease in response to dispatching the message locally for processing within second client 106b (e.g., message dispatch may trigger second client 106b to send an acknowledgement). As another example, in some embodiments, second client 106b may keep track of unacknowledged messages by incrementing a counter in response to receiving a message and decrementing the counter in response to sending an acknowledgement (e.g., second client 106b may be configured to send an acknowledgement once it has performed some or all of the processing of the message).

At step 224, method 250 determines whether a demand of the second client 106b for the messages associated with the message topic has fallen below a first threshold. The first threshold may be set to any suitable value (e.g., 0, 1, 2, . . . n). In some embodiments, the demand is considered to have fallen below the threshold when the demand is less than a threshold value configured for the first threshold. In some embodiments, such as embodiments that set the threshold value to zero, the demand is considered to have fallen below the threshold when the demand is less than or equal to the threshold value. In some embodiments, the first threshold may be set dynamically depending on an overall load on the second client 106b (taking into consideration, e.g., other workflows of second client 106b). Thus, the threshold may be higher during times of low overall load and the threshold may be lower during times of high overall load. In some embodiments, the number of the messages associated with the message topic that have not been acknowledged by the second client 106b may be added with a number of messages that have not been acknowledged by second client 106b for other message topics to which it subscribes in order to determine whether collectively the unacknowledged messages exceed a threshold. The second client 106b could use this information to determine whether to unsubscribe from a group of message topics or to prioritize which message topics to remain subscribed to when a collective number of unacknowledged messages is high.

In response to determining at step 224 that demand is above the first threshold, method 250 returns to step 220, as shown by the "no" case in FIG. 2B (e.g., second client 106b may continue to receive messages and monitor demand). Alternatively, based at least in part on determining at step 224 that the demand of the second client 106b for the messages associated with the message topic has fallen below the first threshold, the message proceeds to step 226, as shown by the "yes" case illustrated in FIG. 2B.

As a further example of step 224, certain embodiments determine the demand based on a maximum window size minus a number of the messages associated with the message topic that have been received-but-not-yet acknowledged by the second client 106b. Suppose the maximum window size is 10 messages and the first threshold is set to 0 (which allows the second client 106b to continue to receive but not yet acknowledge messages until reaching the maximum window size). If the number of received-but-not-yet acknowledged messages is 7 messages, the demand would be 10−7=3. When the demand is 3, the demand does not fall below the example first threshold of 0, so follow the "no" case for step 224 of FIG. 2B (i.e., return to step 220 to continue to receive new messages). If, however, the number of received-but-not yet acknowledged messages is 10 messages, the demand would be 10−10=0. When the demand is 0, the demand is considered to fall below the example first threshold of 0, so follow the "yes" case illustrated for step 224 of FIG. 2B (i.e., proceed to step 226 to unsub scribe from the message topic). Thus, in this example, when the number of messages awaiting acknowledgement exceeds the maximum window size, it indicates that demand has fallen below the first threshold.

In step 226, method 250 unsubscribes the second client 106b from the message topic. When unsubscribed, second client 106b stops receiving new messages for the message topic, which allows second client 106b an opportunity to catch up with processing older messages and may alleviate backpressure on message bus 102. Optionally, in some embodiments, the decision to unsubscribe from the message topic in step 226 may be further based on one or more additional criteria, such as whether the demand has fallen below the first threshold for at least a pre-determined period. In some embodiments, the pre-determined period may be measured by a timer and/or a counter. For example, the second client 106b may be configured to unsubscribe from the message topic if the demand is continuously below the threshold for X amount of time, if the demand is below the threshold N instances during the past Y amount of time, and/or other suitable measure. The pre-determined period can either be statically configured or a dynamic value that uses an adaptive design.

After unsubscribing from the message topic, second client 106b continues acknowledging messages that had been received prior to unsubscribing. In this manner, second client 106b can catch up with previously received but not-yet-acknowledged messages. Method 250 continues to monitor the demand of the second client 106b for the messages associated with the message topic, as shown in step 228.

At step 230, method 250 determines whether the demand of the second client 106b for the messages associated with the message topic exceeds a second threshold. The second threshold may be set to any suitable value, and the optimal value may depend on the implementation. In some embodiments, the second threshold is the same as the first threshold discussed with respect to step 224. In other embodiments, the second threshold may be greater than the first threshold. Configuring the second threshold to be the same as the first threshold may allow second client 106b to resume receiving new messages sooner than if the second threshold were configured to be greater than the first threshold. On the other hand, setting the second threshold greater than the first threshold may allow second client 106b to acknowledge more of the old messages before receiving new messages, for example, in order to alleviate more of the backlog on second client 106b before receiving new messages.

In response to determining at step 230 that demand is below the second threshold, method 250 returns to step 228, which FIG. 2B illustrates as the "no" case for step 230 (e.g., second client 106b may continue to catch up with previous messages and monitor the demand/wait for the demand to reach a level indicating that second client 106b has the capacity to process new messages). Alternatively, based at least in part on determining at step 230 that the demand of the second client 106b for the messages associated with the message topic has exceeded the second threshold, the message proceeds to step 232, which FIG. 2B illustrates as the "yes" case for step 230.

At step 232, method 250 comprises re-subscribing the second client 106b to the message topic. Optionally, in some embodiments, the decision to re-subscribe to the message topic may be further based on one or more additional criteria, such as whether the demand has exceeded the second threshold for at least a pre-determined period. In some embodiments, the pre-determined period may be measured by a timer, a counter, and/or other suitable measure. The pre-determined period can either be statically configured or a dynamic value that uses an adaptive design. As an example, in some embodiments, the pre-determined period can be a bounded random delay configured to reduce a rate of flapping between a subscribed and unsubscribed status. The bound can be adaptively implemented as a median of last k durations of elapsed time between demand flapping around the first threshold and/or second threshold (which as discussed above, may be the same threshold, e.g., a demand of 0 may trigger unsubscribing from a message topic and a demand greater than 0 may trigger re-subscribing to the message topic). The optional pre-determined period for unsubscribing in step 226 may be the same as or different from the optional pre-determined period for re-subscribing in step 232. Use of such a pre-determined period may be implemented at step 226, at step 232, at both steps, or at neither step, depending on the embodiment.

After re-subscribing, method 250 may return to step 220 with receiving new messages for the message topic. For example, method 250 may repeat until the second client 106b has received all of the messages for the message topic, at which point method 250 may end.

In some embodiments, the message bus system 100 that performs a method described herein, such as method 200 of FIG. 2A and/or method 250 of FIG. 2B, is configured as a clustered controller including a first controller 108a (e.g., a first client 106a and a first messaging server 104a of the plurality of messaging servers 104) and a second controller 108b (e.g., a second client 106b and a second messaging server 104b of the plurality of messaging servers 104). Controllers 108a and 108b may be configured as peers such that the messaging between them comprises peer-to-peer traffic. In some embodiments, the message bus system 100 that performs a method described herein, such as the method of FIG. 2A and/or FIG. 2B, is implemented in an enclosed system that prevents the messages associated with a message topic from being offloaded to a system external to the message bus system, such as an external bus or external buffer.

Although certain embodiments have been described in terms of the throttling of the rate at which the publishing client 106 publishes the additional messages (e.g., FIG. 2A) as being initiated by message bus 102/messaging server(s) 104 and the unsubscribing of the subscribing client 106 from the message topic (e.g., FIG. 2B) as being initiated by the subscribing client 106 itself, other embodiments may allocate the functionality differently among components of message bus system 100. In general, if message bus system 100 (or one or more of its components) detects a congestion hotspot or bottleneck, message bus system 100 (or one or more of its components) can throttle a publishing rate of new messages and/or unsubscribe client(s) 106 in order to mitigate congestion. If message bus system 100 (or one or more of its components) detects that congestion has dissipated, message bus system 100 (or one or more of its components) can stop throttling the publishing rate and/or re-subscribe client(s) 106.

Figure 3:
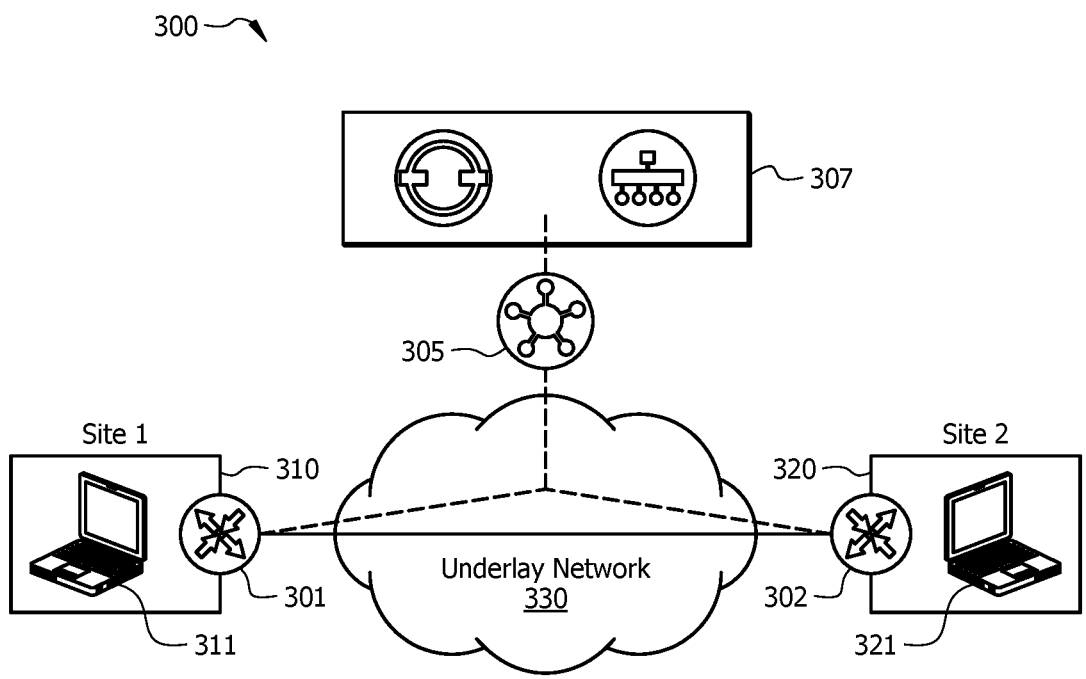
FIG. 3 illustrates an example architecture of an SD-WAN.

Certain embodiments may include message bus system 100 within a component of an SD-WAN. FIG. 3 illustrates an example architecture of an SD-WAN (network 300). The SD-WAN is a virtual overlay network based on tunnels that carry traffic between a plurality of sites over one or more underlay networks 330. The example illustrated in FIG. 3 shows two sites: a first site 310 and a second site 320. Each site may comprise one or more user devices, for example, as shown by user device 311 of first site 310 and user device 321 of second site 320. Each site may connect to the network 300 via one or more WAN-edge routers. For example, the first site 310 connects to the network 300 through an edge router 301, and the second site 320 connects to the network 300 through an edge router 302. A site connected to the network 300 may have a data plane connection to each of the other sites through Internet Protocol Security (IPSec) tunnels. The edge routers 301 and 302 may have a data plane connection over the underlay network 330. The underlay network 330 may comprise Multiprotocol Label Switching (MPLS), Internet, and cellular networks. An SD-WAN control plane may comprise an SD-WAN controller 305 that may maintain a centralized routing table and the routing policies to program the forwarding behavior of the data plane. The SD-WAN controller 305 may maintain direct control plane connection to each edge router. The SD-WAN controller 305 may provision, maintain, and secure the entire overlay network. The SD-WAN network 300 may also comprise management/orchestration plane 307. Although this disclosure describes a SD-WAN network in a particular manner, this disclosure contemplates a SD-WAN network in any suitable manner.

In some embodiments, SD-WAN controller 305 may comprise message bus system 100 (e.g., controllers 108 of the message bus system 100 may facilitate functionality of SD-WAN controller 305). Examples of control directives that may be controlled by message bus system 100 include network configuration or network policy changes that govern the SD-WAN overlay network. The congestion mitigation mechanisms of message bus system 100 can be used to ensure that the datapath as well as controller cluster itself can enact backpressure such that control directives do not infinitely pile on to the point that message bus system 10 ends up queuing up directives with no chance of being able to serve those requests. Or worse, the system collapses to the weight of ever-growing control directives being queued up.

Other embodiments may include message bus system 100 in other components of the SD-WAN. As an example, a message bus system 100 may be used in an edge router 301 or 302 to facilitate controls within the edge router. As another example, messaging servers 104 of message bus system 100 may be used in one portion of the SD-WAN (such as SD-WAN controller 305) and messaging clients 106 of message bus system may be used in another portion of the SD-WAN (such as edge router 301 or 302).

Figure 4:
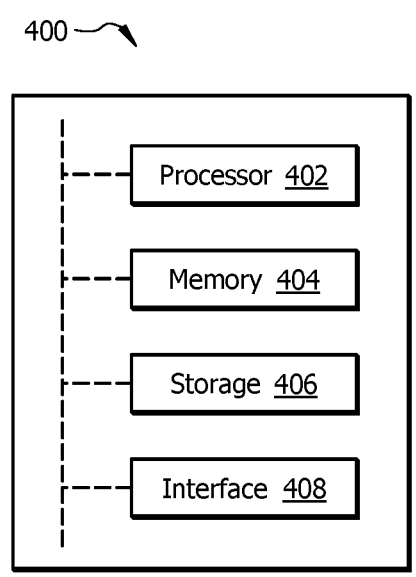
FIG. 4 illustrates an example of a computer system.

FIG. 4 illustrates an example computing components 400 that may be used to implement one or more elements of message bus system 100 and/or one or more elements of network 300. For example, computing components 400 may be used in performing one or more steps of one or more methods described or illustrated herein, such as one or more steps of method 200 or 250. Any suitable number of computing components 400 may be used, and the computing components 400 may be arranged in any suitable manner. In particular embodiments, computing components may include processing circuitry (e.g., one or more processors 402), memory 404, storage 406, and/or one or more interfaces 408.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor. In certain embodiments, processor 402 may include one or more modules (e.g., module X, module Y, etc.) to facilitate the functionality described herein.

In particular embodiments, memory 404 includes main memory for storing instructions for processor 402 to execute or data for processor 402 to operate on. As an example, and not by way of limitation, a computer system may load instructions from storage 406 or another source to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

Computing components 400 may comprise one or more interfaces 408. Each interface 408 includes hardware, software, or both. In general, interface 408 receives input, sends output, processes the input and/or output, and/or performs other suitable operation. Examples of an interface 408 may include an I/O interface or a communication interface. For example, an I/O interface may facilitate communication between a computer system and one or more I/O devices. In some embodiments, an I/O device may enable communication between a person and computer system. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces for them. Where appropriate, an I/O interface may include one or more device or software drivers enabling processor 402 to drive one or more of these I/O devices. An I/O interface may include one or more I/O interfaces, where appropriate. Although this disclosure describes a particular I/O interface, this disclosure contemplates any suitable I/O interface.

In particular embodiments, a communication interface includes hardware, software, or both providing one or more interfaces for communication. In some embodiments, communication interface may facilitate communications with one or more computer systems or one or more networks. As an example, and not by way of limitation, a communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface for it. Examples of networks may include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. Examples of wireless networks may include a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Certain embodiments of interface 408 may include any suitable communication interface for any of these networks, where appropriate. Certain embodiments may include one or more communication interfaces, where appropriate. Although this disclosure describes a particular communication interface, this disclosure contemplates any suitable communication interface.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Certain embodiments may mitigate congestion in a message bus system. There are, proposed herein, various embodiments which address one or more of the issues disclosed herein.

According to an embodiment, a system may include one or more processors and one or more computer-readable non-transitory storage media. The one or more computer-readable non-transitory storage media comprise instructions that, when executed by the one or more processors, cause one or more components of the system to perform operations comprising: receiving messages associated with a message topic via a bus; determining that a demand for the messages associated with the message topic has fallen below a first threshold; and cancelling a subscription to the message topic in response to determining that the demand for the messages associated with the message topic has fallen below the first threshold. In certain embodiments, the operations may further comprise, after cancelling the subscription to the message topic, determining that the demand for the messages associated with the message topic exceeds a second threshold (the second threshold may or may not be the same as the first threshold) and, in response, re-subscribing to the message topic.

According to another embodiment, a method comprises receiving messages associated with a message topic via a bus; determining that a demand for the messages associated with the message topic has fallen below a first threshold; and cancelling a subscription to the message topic in response to determining that the demand for the messages associated with the message topic has fallen below the first threshold. In certain embodiments, the method further comprises, after cancelling the subscription to the message topic, determining that the demand for the messages associated with the message topic exceeds a second threshold and, in response, re-subscribing to the message topic.

According to yet another embodiment, one or more computer-readable non-transitory storage media may embody instructions that, when executed by a processor, cause the performance of operations including receiving messages associated with a message topic via a bus; determining that a demand for the messages associated with the message topic has fallen below a first threshold; and cancelling a subscription to the message topic in response to determining that the demand for the messages associated with the message topic has fallen below the first threshold. In certain embodiments, the operations may further comprise, after cancelling the subscription to the message topic, determining that the demand for the messages associated with the message topic exceeds a second threshold and, in response, re-subscribing to the message topic.

According to an embodiment, a system may include one or more processors and one or more computer-readable non-transitory storage media. The one or more computer-readable non-transitory storage media comprise instructions that, when executed by the one or more processors, cause one or more components of the system to perform operations comprising: sending messages to a consumer via a bus; determining whether a number of unacknowledged messages exceeds a first threshold, the unacknowledged messages corresponding to messages for which the system has not receive an acknowledgment from the consumer; and decreasing a rate of sending the messages to the consumer in response to determining that the number of unacknowledged message exceeds the first threshold. In certain embodiments, the operations may further comprise, after decreasing the rate of sending the messages to the consumer, determining that the number of unacknowledged messages is below a second threshold (the second threshold may or may not be the same as the first threshold) and, in response, increasing the rate of sending the messages to the consumer.

According to another embodiment, a method comprises sending messages to a consumer via a bus; determining whether a number of unacknowledged messages exceeds a first threshold, the unacknowledged messages corresponding to messages for which the system has not receive an acknowledgment from the consumer; and decreasing a rate of sending the messages to the consumer in response to determining that the number of unacknowledged message exceeds the first threshold. In certain embodiments, the operations may further comprise, after decreasing the rate of sending the messages to the consumer, determining that the number of unacknowledged messages is below a second threshold and, in response, increasing the rate of sending the messages to the consumer.

According to yet another embodiment, one or more computer-readable non-transitory storage media may embody instructions that, when executed by a processor, cause the performance of operations including sending messages to a consumer via a bus; determining whether a number of unacknowledged messages exceeds a first threshold, the unacknowledged messages corresponding to messages for which the system has not receive an acknowledgment from the consumer; and decreasing a rate of sending the messages to the consumer in response to determining that the number of unacknowledged message exceeds the first threshold. In certain embodiments, the operations may further comprise, after decreasing the rate of sending the messages to the consumer, determining that the number of unacknowledged messages is below a second threshold and, in response, increasing the rate of sending the messages to the consumer.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular directed to a method, a storage medium, a system and a computer program product, wherein any feature mentioned in one category (e.g., method) can be applicable in another category (e.g., system) as well. The various features disclosed herein may be combined or separated in any suitable manner.

The invention claimed is:

1. A message bus system, comprising:
a first client configured to publish messages associated with a message topic to a message bus; and
a second client configured to receive the messages associated with the message topic from the message bus, wherein the message bus system is configured to:
determine that a demand of the second client for the messages associated with the message topic has fallen below a first threshold; and
unsubscribe the second client from the message topic based at least in part on determining that the demand of the second client for the messages associated with the message topic has fallen below the first thresholds;
wherein, when the second client has been unsubscribed from the message topic, the message bus system further configured to:
determine that the demand of the second client for the messages associated with the message topic exceeds a second threshold; and
re-subscribe the second client to the message topic based at least in part on determining that the demand of the second client for the messages associated with the message topic exceeds the second threshold.

2. The system of claim 1, wherein the demand of the second client is based on a maximum window size of the second client minus a number of the messages associated with the message topic not yet acknowledged by the second client.

3. The message bus system of claim 1, wherein re-subscribing the second client to the message topic is further based on determining that the demand of the second client for the messages associated with the message topic has exceeded the second threshold for at least a pre-determined period.

4. The message bus system of claim 1, wherein the message bus system is further configured to:
throttle a rate at which the first client publishes additional messages associated with the message topic to the message bus, the throttling based at least in part on determining that a number of the messages associated with the message topic that have not been acknowledged by the second client exceeds a threshold.

5. The message bus system of claim 1, wherein the message bus system is implemented in an enclosed system that prevents the messages associated with the message topic from being offloaded to a system external to the message bus system.

6. The message bus system of claim 1, wherein the message bus of the message bus system comprises a messaging fabric made up of a plurality of messaging servers.

7. The message bus system of claim 6, wherein the message bus system implements a clustered controller that includes a first controller and a second controller, the first controller comprising a first of the plurality of messaging servers and the first client, the second controller comprising a second of the plurality of messaging servers and the second client.

8. A method performed by one or more processors of a message bus system, the method comprising:
determining that a demand of client for receiving messages associated with a message topic via a message bus has fallen below a first threshold, the demand based on a number of messages associated with the message topic that have been published to the client via the message bus but have not yet been acknowledged by the client; and
unsubscribing the client from the message topic based at least in part on determining that the demand of the client for receiving the messages associated with the message topic via the message bus has fallen below the first threshold; and
re-subscribing the client to the message topic based at least in part on determining that, while the client is unsubscribed from the message topic, the demand of the client for receiving the messages associated with the message topic via the message bus has exceeded a second threshold.

9. The method of claim 8, wherein re-subscribing the client to the message topic is further based on determining that the demand of the client for receiving the messages associated with the message topic via the message bus has exceeded the second threshold for at least a pre-determined period.

10. The method of claim 8, wherein the first threshold is the same as the second threshold.

11. The method of claim 9, further comprising:
throttling a rate at which a publisher publishes additional messages associated with the message topic to the message bus, the throttling based at least in part on determining that the number of messages associated with the message topic that have been published to the client via the message bus but have not yet been acknowledged by the client exceeds a threshold for throttling the publisher.

12. The method of claim 11, wherein:
the unsubscribing of the client from the message topic is initiated by the client; and
the throttling of the rate at which the publisher publishes the additional messages is initiated by the message bus.

13. One or more computer-readable non-transitory storage media embodying instructions that, when executed by a processor, cause the performance of operations including:
determining that a demand of client for receiving messages associated with a message topic via a message bus has fallen below a first threshold, the demand based on a number of messages associated with the message topic that have been published to the client via the message bus but have not yet been acknowledged by the client;

unsubscribing the client from the message topic based at least in part on determining that the demand of the client for receiving the messages associated with the message topic via the message bus has fallen below the first threshold; and re-subscribing the client to the message topic based at least in part on determining that, while the client is unsubscribed from the message topic, the demand of the client for receiving the messages associated with the message topic via the message bus has exceeded a second threshold.

14. The one or more computer-readable non-transitory storage media of claim 13, wherein re-subscribing the client to the message topic is further based on determining that the demand of the client for receiving the messages associated with the message topic via the message bus has exceeded the second threshold for at least a pre-determined period.

15. The one or more computer-readable non-transitory storage media of claim 13, wherein the first threshold is the same as the second threshold.

16. The one or more computer-readable non-transitory storage media of claim 13, the operations further comprising:

throttling a rate at which a publisher publishes additional messages associated with the message topic to the message bus, the throttling based at least in part on determining that the number of messages associated with the message topic that have been published to the client via the message bus but have not yet been acknowledged by the client exceeds a threshold for throttling the publisher.

17. The one or more computer-readable non-transitory storage media of claim 16, wherein:

the unsubscribing of the client from the message topic is initiated by the client; and the throttling of the rate at which the publisher publishes the additional messages is initiated by the message bus.

\* \* \* \* \*